No. 789,603. PATENTED MAY 9, 1905.
S. E. FREEMAN.
MACHINE FOR MAKING AND REPAIRING ROADS.
APPLICATION FILED SEPT. 1, 1904.
4 SHEETS—SHEET 2.
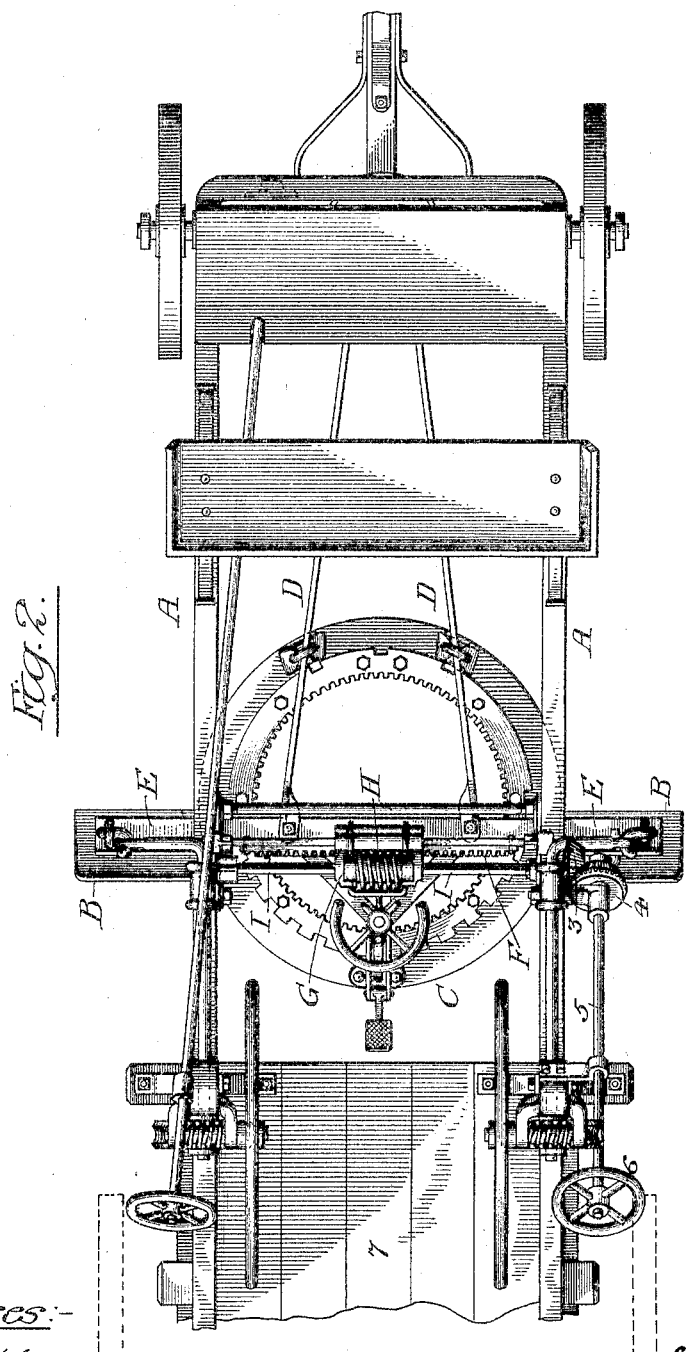

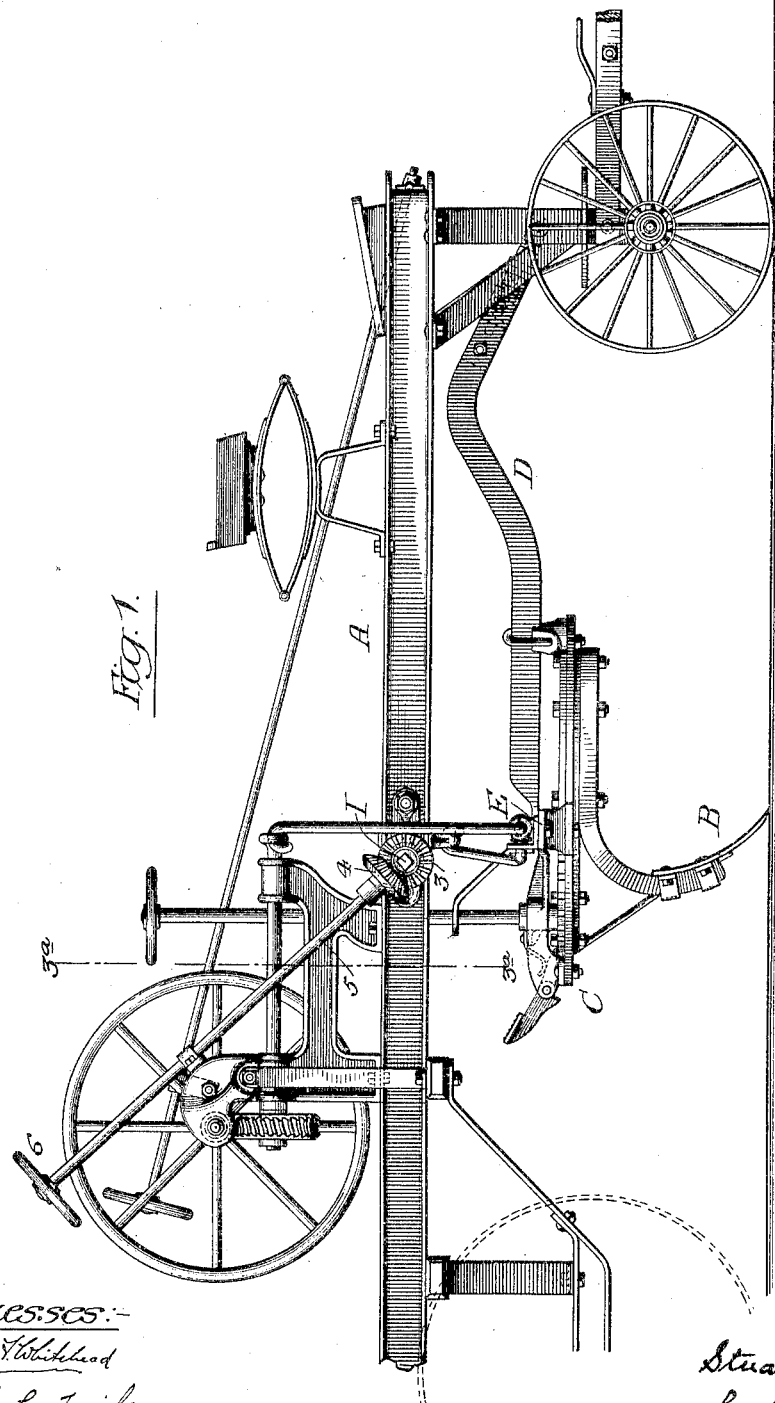

No. 789,603. PATENTED MAY 9, 1905.
S. E. FREEMAN.
MACHINE FOR MAKING AND REPAIRING ROADS.
APPLICATION FILED SEPT. 1, 1904.
4 SHEETS—SHEET 3.